Nov. 2, 1926.  
C. W. CALDWELL  
1,605,426  
CELLULAR FRUIT SHIPPING DEVICE  
Filed Sept. 29, 1925   2 Sheets-Sheet 1
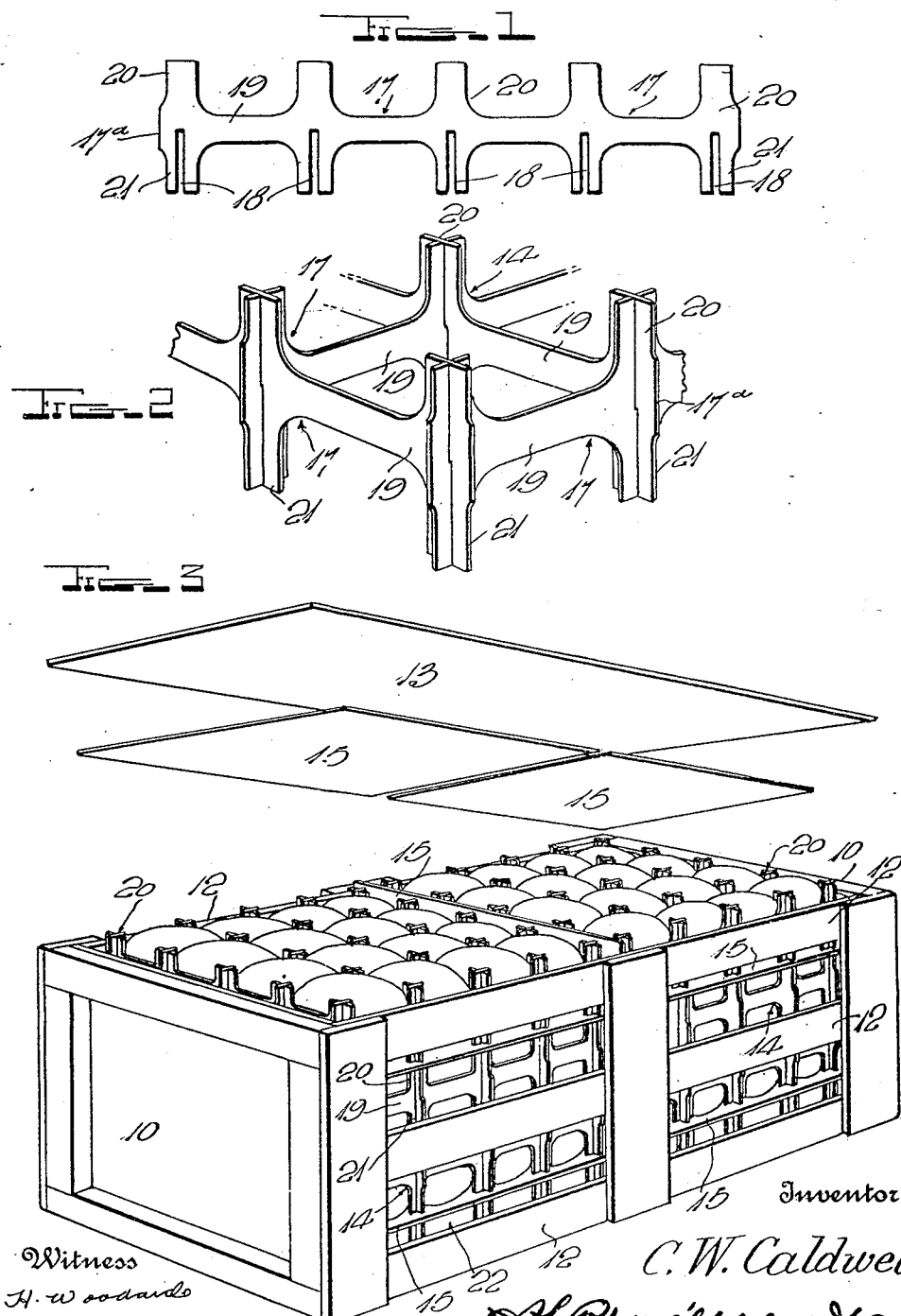

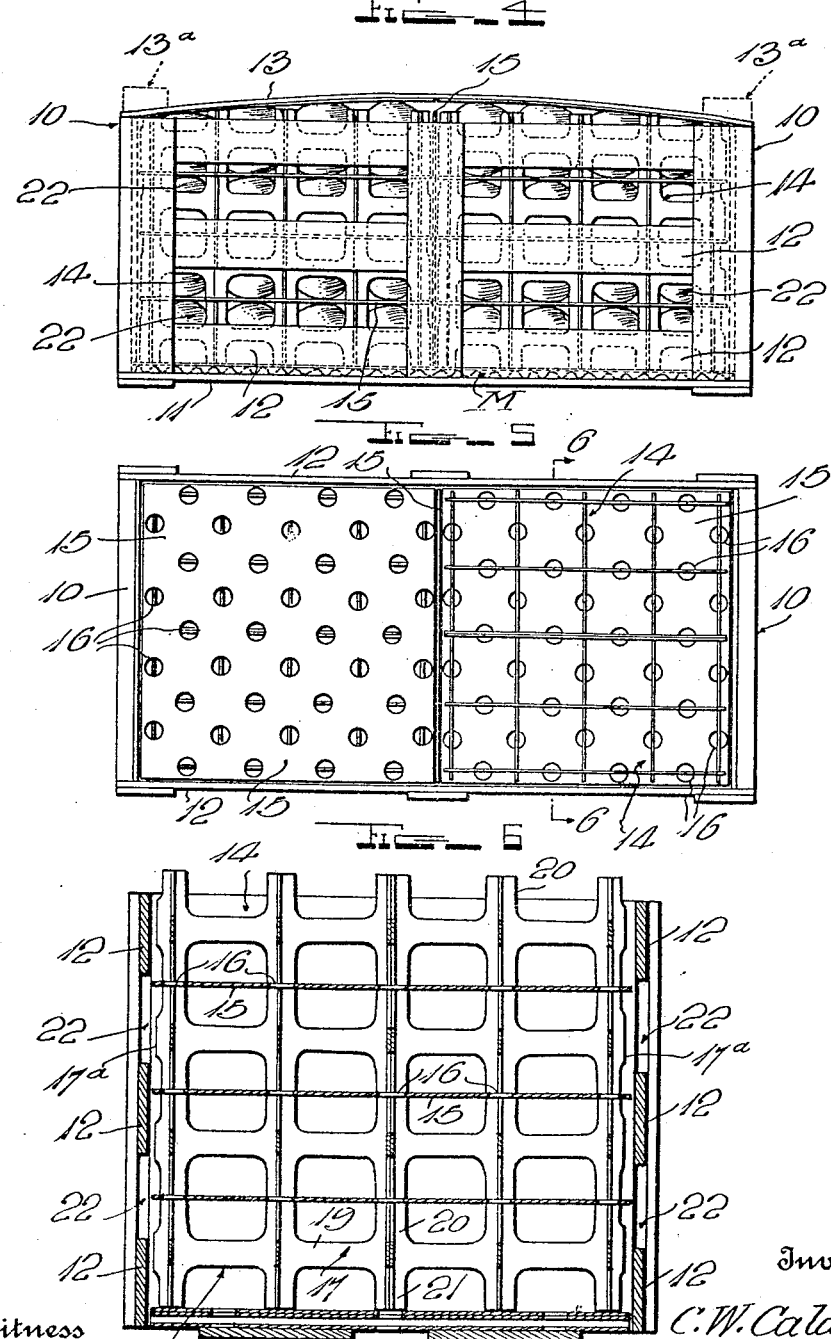

Patented Nov. 2, 1926.

1,605,426

UNITED STATES PATENT OFFICE.

CHARLES W. CALDWELL, OF NEW YORK, N. Y.

CELLULAR FRUIT-SHIPPING DEVICE.

Application filed September 29, 1925. Serial No. 59,391.

The invention relates to shipping devices embodying cellular frames or fillers received in an outside container, the cells forming independent pockets for reception of the objects to be shipped. Devices of this character have been quite extensively used for shipping eggs and frangible articles of manufacture, and have also been employed to some extent for shipping fruit. There are many advantages for this latter use, yet the devices have never been extensively employed for this purpose, for such reasons as the following:—They have been of such construction as to obscure the fruit and prevent inspection thereof by prospective purchasers, necessitating opening of the containers for such inspection; they have not provided adequately for the free circulation of air around the individual pieces of fruit and in all directions throughout the entire outside container or crate; the cellular frames or fillers have required a relatively great amount of cardboard or the equivalent and have hence been rather expensive; and these frames have required special containers, whereas the only practical container for shipping fruit, such as peaches, oranges, etc., is the usual slatted crate approved by all growers, packers and shippers of such fruits, and today universally used.

My invention was produced to overcome the difficulties heretofore encountered, and provides for the inexpensive and practical association of specially constructed cellular frames or fillers and perforated partition mats with the ordinary or standard slatted crates in such manner as to not only permit clear view of most of the contained fruit without opening the crate, but to also provide for effective circulation of air in all directions around each piece of fruit to resist decay or spreading of decay, this circulation of air being particularly advantageous when shipping in the usual refrigerator cars, as well as when the crates of fruit are being held in cold storage plants as is now quite generally done.

The invention is hereinafter fully described and claimed, reference being made to the accompanying drawings in the descriptive matter.

Figure 1 is a side elevation of one of the units out of which the cellular frames are made.

Figure 2 is a perspective view of a portion of one of the cellular frames or fillers.

Figure 3 is a perspective view of a crate fully packed with fruit and ready for the application of the cover, showing the attractive display of fruit when the cover is elevated.

Figure 4 is a side elevation of a packed crate, disclosing the manner in which large areas of the fruit are exposed and the crate is closed.

Figure 5 is a top plan view of the crate with the cover and one of the cellular frames removed.

Figure 6 is a vertical transverse sectional view taken on line 6—6 of Fig. 5.

In the drawings above briefly described, C designates an ordinary fruit shipping crate which embodies solid ends 10, a slatted bottom 11, side walls formed of spaced slats 12, and a flexible cover 13 usually composed of one piece of thin wood. Disposed horizontally in the crate C, in superposed relation, are alternate cellular frames 14 and partitions or mats 15, formed of cardboard or the like, said partitions having ventilating openings 16 in communication with the cells of the frames 14. There is preferably one series of the frames and partitions filling one-half of the crate and another similar series filling the other half thereof. If desired, the two series may be separated by one of the perforated partitions placed in an upright position between them.

Each frame or filler 14 is composed of a plurality of strips 17 transversely slotted as at 18 to receive portions of each other. Each of these strips includes a central longitudinal portion or member 19 of trivial width with regard to the diameter of the fruit to be contained in the cells, and upper and lower vertical portions or members 20 and 21 respectively, project from the edges of the central portion 19 at spaced points, said portions 20 and 21 being preferably of about the same width as said portion 19. These upper and lower vertical portions 20 and 21, jointly form vertical posts which are located at the vertical corners of the cells, the posts of any frame 14 serving to effectively support the overlying partition mat 15. As shown in Fig. 1, the ends of the strips 17 have their upper and lower portions cut away to leave projecting stops 17$^a$. The projections of these ends beyond the outside faces of the outermost strips 17 of the cellular frames provides air spaces between the frames and the inner faces of the side and end walls of the crate, as will be noted upon reference to Fig. 5.

Preferably, a corrugated mat M is placed on the crate bottom to yieldably support the fruit, this mat being perforated the same as the partition mats 15 so that the perforations or openings 16 in all superposed mats are in vertical alinement to facilitate the free circulation of air through the cells.

The central, longitudinal portions or members 19 of the strips 17, at the four sides of each cell, constitute side members for said cell, which are of a vertical width greatly exceeded by the vertical dimension of the spaces 22 between the crate slats 12. Thus, even if one of the portions 19 is disposed opposite one of the spaces 22, it will not obscure the fruit, but the latter may be readily viewed through said space 22 and those existing above and below the portion 19. Usually, portions or members 19 of the two series of frames come opposite certain of the spaces 22 of the crate, and certain of the partitions 15 have their edges disposed at other spaces, as seen most clearly in Figs. 4 and 6. Thus, ample areas of the fruit are visible, so that the general condition thereof may be readily determined without the necessity of opening the crate.

On reference to Figs. 4 and 6 of the drawings, it will be noted that the interior depth of the crate is slightly less than the height of the vertical series of superposed frames or fillers 14 and partition mats 15, so that the fruit in the tops of the uppermost frames project slightly above the upper edges of the side and end walls of the crate, the cover 13 being slightly bowed when fastened to close the crate. This feature together with the particular shape of the strips 17 composing the frames 14, produces a superior display of fruit when the crate cover is lifted or removed since not only the top but also all sides of each piece of fruit in the uppermost frames can be seen. This very attractive display of the fruit enhances the value of the package. When the ends of the cover 13 are nailed to the end walls of the crate, the bowing of the cover in a longitudinal direction as seen in Fig. 4, will put tension upon the contents of the crate, which will prevent shifting of the parts in transit and also take care of the slight shrinkage of the fruit. To prevent mashing of the fruit when one crate is placed upon another in refrigeration plants or cars, cross strips 13ª as shown in dotted lines in Fig. 4, are nailed on the ends of the cover, these strips being of greater height than the height of the bow in the cover.

My improved fruit holding means not only provides for the fruit being individually supported, readily examined, and attractively displayed as above set forth, but also insures the utmost circulation of air in all directions around each piece of fruit no matter in what position the crate may rest. This is of the utmost importance when soft fruits such as peaches are held in cold storage and when they are shipped in refrigerator cars as is necessary in long distant shipments. The provision of at least four openings 15 in the partition mats 14 for each cell and the formation of the cell walls of very narrow central portions 19 and narrow upright portions 21, 21, permits of the unobstructed circulation of air length-wise, cross-wise and vertically throughout all of the cells and the entire crate. Because of this free circulation of air, the temperature throughout the crate quickly becomes uniform, sweat is rapidly evaporated and decay is resisted and its spreading is reduced.

In addition to having the advantages so far described, it will be seen that the specific construction of the strips 17, requires very little material, permitting the frames 14 to be inexpensively manufactured.

I have for some time made practical use of the invention, embodying the details herein disclosed. Such details may therefore be considered as preferred, but within the scope of the invention as claimed, slight variations may be made.

I claim:

1. A fruit crate filler consisting of a series of narrow members and a second series of narrow members at right angles thereto, both series being joined by vertical posts extending in opposite directions from said narrow members whereby the latter are positioned adjacent the middle of the contained fruit.

2. A cellular fruit shipping frame comprising crossed strips slotted to partly receive each other, each strip comprising a central longitudinal portion of trivial width with regard to the diameter of the pieces of fruit to be contained by the cells, and narrow vertical portions branching from the upper and lower edges of said central portion at longitudinally spaced points, the upper and lower branch portions of the crossed strips jointly forming vertically elongated partition-supporting posts disposed at the corners of the cells and of a height at least equal to the diameter of the pieces of fruit to be contained by the cells.

3. A fruit shipping and storing means for use in a standard slatted fruit crate, comprising alternate cellular frames and partition mats disposed horizontally in superposed relation, said frames consisting of crossed strips slotted to partly receive and interlock with each other to form individual fruit cells, each strip having a central longitudinal portion of trivial width with regard to the diameter of the pieces of fruit to be contained in the individual cells and narrow vertical portions branching from the upper and lower edges of said central portion at longitudinally spaced points, the upper and lower branch portions of the crossed strips jointly forming posts disposed at the corners of the cells for engagement with said mats, the latter having crossed rows of openings positioned at points between said posts, whereby relatively large passageways are formed through the crate for the free circulation of air length-wise, cross-wise and vertically in the individual cells around the fruit therein, for the purposes set forth.

In testimony whereof I have hereunto affixed my signature.

CHARLES W. CALDWELL.